(12) United States Patent
Lee et al.

(10) Patent No.: US 9,438,438 B2
(45) Date of Patent: Sep. 6, 2016

(54) METHOD FOR TRANSMITTING A TERMINAL GROUP ZONE IDENTIFIER IN MACHINE-TO-MACHINE COMMUNICATION

(75) Inventors: Eunjong Lee, Anyang-si (KR); Youngsoo Yuk, Anyang-si (KR); Giwon Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 431 days.

(21) Appl. No.: 14/233,346

(22) PCT Filed: Mar. 30, 2012

(86) PCT No.: PCT/KR2012/002422
§ 371 (c)(1),
(2), (4) Date: Jan. 16, 2014

(87) PCT Pub. No.: WO2013/032093
PCT Pub. Date: Mar. 7, 2013

(65) Prior Publication Data
US 2014/0169259 A1    Jun. 19, 2014

Related U.S. Application Data

(60) Provisional application No. 61/527,620, filed on Aug. 26, 2011, provisional application No. 61/532,573,
(Continued)

(51) Int. Cl.
*H04L 12/28* (2006.01)
*H04L 12/18* (2006.01)
(Continued)

(52) U.S. Cl.
CPC ............ *H04L 12/189* (2013.01); *H04W 4/005* (2013.01); *H04W 4/06* (2013.01); *H04W 60/00* (2013.01); *H04L 61/2069* (2013.01); *H04W 48/12* (2013.01); *H04W 92/18* (2013.01)

(58) Field of Classification Search
USPC .......................................... 370/252, 329, 386
See application file for complete search history.

(56) References Cited

U.S. PATENT DOCUMENTS

2013/0039243 A1* 2/2013 Park .................. H04W 52/0216
370/311
2013/0051296 A1* 2/2013 Park ...................... H04W 68/00
370/311

FOREIGN PATENT DOCUMENTS

CN    102056334 A    5/2011
CN    102111922 A    6/2011

OTHER PUBLICATIONS

Kim et al., "Proposed text of MGID Reassignment Prodedure in IEEE 802.16p System", IEEE C802.16p-11/0144 (Jul. 2011).
(Continued)

*Primary Examiner* — John Pezzlo
(74) *Attorney, Agent, or Firm* — Dentons US LLP

(57) ABSTRACT

Disclosed is a method for determining whether or not a machine-to-machine (M2M) group identifier (MGID) for identifying a multicast service flow shared by a group of M2M communication terminals in an M2M group zone allocated to a terminal is supported in a wireless access system that supports M2M communication. The method comprises the steps of: receiving, from a first base station, an ID of an M2M group zone to which the first base station belongs; receiving, from the first base station, an MGID and an ID of an M2M group zone in which the MGID is supported; receiving, from the first base station or from a second base station, an ID of an M2M group zone to which the second base station belongs; and determining whether or not the received MGID is supported on the basis of the received ID of the M2M group zone to which the second base station belongs.

16 Claims, 3 Drawing Sheets

Related U.S. Application Data filed on Sep. 9, 2011, provisional application No. 61/550,930, filed on Oct. 25, 2011, provisional application No. 61/557,182, filed on Nov. 8, 2011, provisional application No. 61/557,849, filed on Nov. 9, 2011, provisional application No. 61/568,622, filed on Dec. 8, 2011.

(51) Int. Cl.

| | |
|---|---|
| *H04W 4/00* | (2009.01) |
| *H04W 4/06* | (2009.01) |
| *H04W 60/00* | (2009.01) |
| *H04J 1/16* | (2006.01) |
| *H04W 48/12* | (2009.01) |
| *H04W 92/18* | (2009.01) |
| *H04L 29/12* | (2006.01) |

(56) References Cited

OTHER PUBLICATIONS

Kim, Namgi et al., "Proposed text of MGID reassignment procedure in idle state for IEEE 802.16p system", IEEE 802.16 Broadband Wireless Access Working Group, IEEE C802. 16p-11/0144r3, Jul. 9, 2011.

Park, Giwon et al., "Reply contribution on C80216p-11/0002 (Location update)", IEEE 802.16 Broadband Wireless Access Working Group, IEEE C802. 16p-11/0036, Mar. 13, 2011.

Huang, Rui et al., "M2M Group ID Assignment Scheme in IEEE802.16m System", IEEE 802.16 Broadband Wireless Access Working Group, IEEE C802. 16p-11/0154r1, Jul. 8, 2011.

Choi, Jinsoo et al., "Consideration on the Update Procedure of the system Information for M2M", IEEE 802.16 Broadband Wireless Access Working Group, IEEE C802. 16p-10/0023r1, Jan. 7, 2010.

* cited by examiner

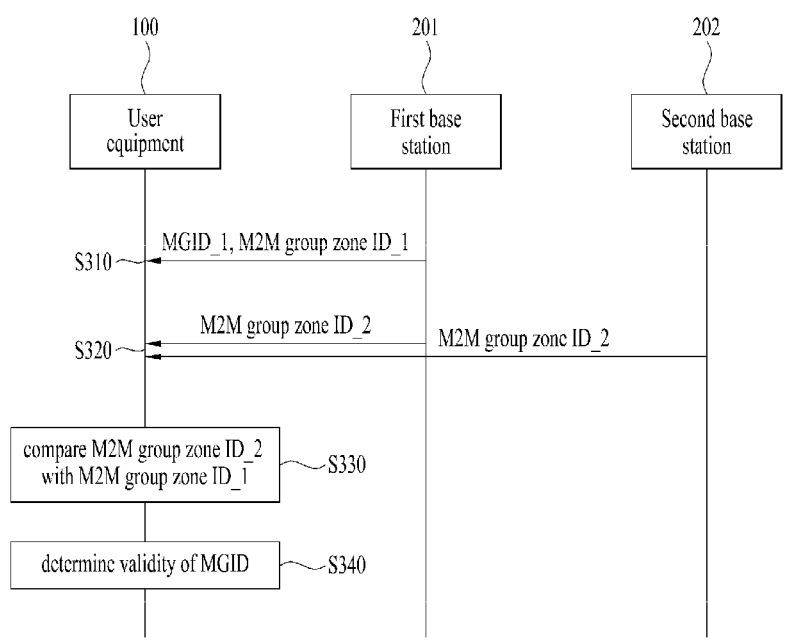

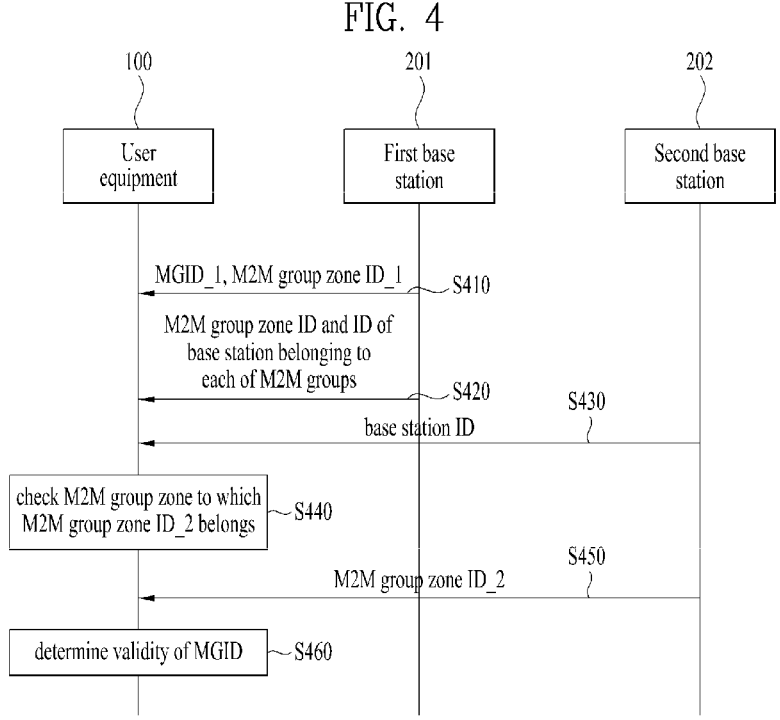
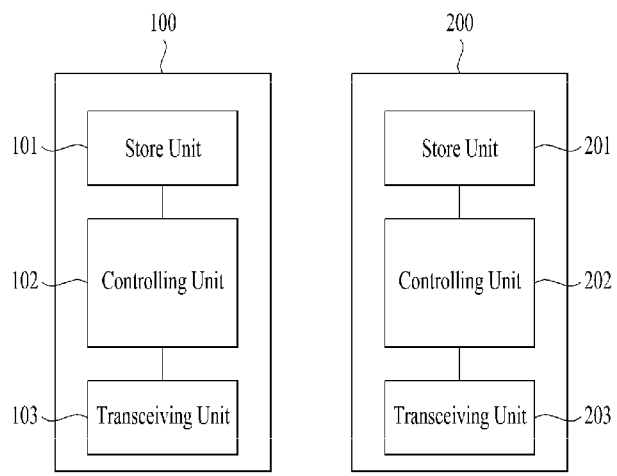

METHOD FOR TRANSMITTING A TERMINAL GROUP ZONE IDENTIFIER IN MACHINE-TO-MACHINE COMMUNICATION

This application is a 35 USC §371 National Stage entry of International Application No. PCT/KR2012/002422, filed on Mar. 30, 2012, and claims priority to U.S. Provisional Application Nos. 61/527,620 filed Aug. 26, 2011; 61/532,573 filed Sep. 9, 2011; 61/550,930 filed Oct. 25, 2011; 61/557,182 filed Nov. 8, 2011; 61/557,849 filed Nov. 9, 2011; and 61/568,622 filed Dec. 8, 2011, all of which are hereby incorporated by reference in its entirety.

TECHNICAL FIELD

The present specification relates to a method of determining validity of an M2M group identifier allocated to an M2M user equipment, and more particularly, to a method of determining whether an M2M group identifier previously allocated to an M2M user equipment based on an M2M group zone identifier is supported.

BACKGROUND ART

Machine-to-Machine Communication (M2M Communication, Machine Type Communication (MTC))

In the following description, a machine-to-machine communication (M2M communication, machine type communication (MTC)) is briefly explained.

A machine-to-machine (hereinafter abbreviated M2M) communication literally means a communication between one electronic device and another electronic device. In particular, the M2M communication means a communication between objects. In general, the M2M communication may mean a wire/wireless communication between electronic devices or a communication between a human-controllable device and a machine. Yet, the M2M communication may specifically indicate a communication between electronic devices, i.e., a device-to-device wireless communication. And, M2M user equipments used in a cellular network are inferior to general user equipments in terms of performance or capability.

A plurality of user equipments may exist within a cell and a plurality of the user equipments can be classified into each other according to a type, a class, a service type and the like of a user equipment.

As an example, a user equipment can be mainly classified into a user equipment for a HTC (human type communication) and a user equipment for a MTC (machine type communication). The MTC may include a communication between M2M user equipments. In this case, the HTC means that a signal transmission is determined by a human and a signal is transmitted and received by a human. On the contrary, the MTC means that each of a plurality of the user equipments transmits a signal on an event occurrence or periodically without human involvement.

And, if a machine-to-machine communication (M2M communication or a machine type communication (MTC)) is considered, the total number of user equipments may rapidly increase. M2M user equipments may have attributes described in the following depending on services supported by the user equipments.

1. a plurality of user equipments within a cell
2. small amount of data quantity
3. low transmission frequency (may have periodicity)
4. data attribute of a limited number
5. not sensitive to time delay
6. may have low mobility or no mobility And, the M2M communication can be used for such various fields as secured access and surveillance, tracking and tracing, public safety (emergency, disaster), payment (vending machine, ticket machine, and parking meter), healthcare, remote controlling, smart meter, and the like.

Idle Mode

An idle mode is a mechanism for enabling a user equipment to periodically receive a downlink broadcast message without registering a specific base station although the user equipment wanders around a radio link environment at which a plurality of base stations are located over regions of a wide range.

The idle mode terminates all normal operations as well as a handover (hereinafter abbreviated HO). The idle mode corresponds to a state with which downlink synchronization is matched only to receive a paging message, which is a broadcast message, in a prescribed interval only. The paging message is a message for indicating the user equipment to perform a paging action. For instance, the paging action may include a ranging performance, a network reentry, and the like.

The idle mode may be initiated by a user equipment or a base station. In particular, the user equipment can enter into the idle mode in a manner of transmitting a de-registration request (DREG-REQ) message to the base station and receiving a de-registration response (DREG-RSP) message from the base station in response to the de-registration request (DREG-REQ) message. And, the base station can enter into the idle mode in a manner of transmitting a non-request de-registration response (DREG-RSP) message or a de-registration command (DREG-CMD) message to the user equipment.

If the user equipment receives a paging message corresponding to the user equipment for an available interval (AI) in the idle mode, the user equipment switches to a connected mode by performing a network entry process with the base station and then transceives data with the base station.

DISCLOSURE OF THE INVENTION

Technical Task

According to a related art, a method for a user equipment or a base station to identify a change of an M2M group zone capable of being occurred due to mobility of the user equipment is not clearly defined yet. Hence, the present specification proposes a method of transmitting the change of the M2M group zone to the user equipment and a method for the user equipment to determine validity of an MGID.

Technical Solution

To achieve these and other advantages and in accordance with the purpose of the present invention, as embodied and broadly described, according to one embodiment, a method of determining whether an M2M group identifier (MGID) identifying a multicast service flow shared by a group of M2M user equipments in an M2M group zone allocated to a user equipment is supported in a wireless access system supporting a machine-to-machine communication (M2M) includes the steps of receiving an ID of an M2M group zone to which a first base station belongs from the first base station, receiving an MGID and an ID of an M2M group zone supportive of the MGID from the first base station, receiving an ID of an M2M group zone to which a second base station belongs from the first base station or the second base station, and determining whether the received MGID is supported based on the received ID of the M2M group zone to which the second base station belongs.

The step of receiving the ID of the M2M group zone to which the second base station belongs from the first base station or the second base station may correspond to a step of receiving the ID of the M2M group zone to which the second base station belongs via an AAI-SCD (system configuration descriptor) message, a DCD (DL channel descriptor) message, an MGMC (M2M device group MAC control) control message, or an NBR-ADV (neighbor advertisement) message transmitted from the first base station or the second base station in a subframe in which a PGID (paging group identifier) information message is transmitted among a paging listening interval of the user equipment.

The step of receiving the ID of the M2M group zone to which the second base station belongs from the second base station may include the steps of performing a process of a network reentry to the second base station and receiving the ID of the M2M group zone to which the second base station belongs from the second base station after the process of the network reentry is performed.

The M2M group zone to which the first station or the second station belongs may include one or more M2M group zones. If the M2M group zone to which the first station belongs includes one or more M2M group zones, the allocated MGID can be supported in a prescribed one M2M group zone only among the M2M group zones to which the first base station belongs.

The M2M group zone to which the first base station or the second base station belongs may include one or more base stations.

The step of receiving the MGID and the ID of the M2M group zone to which the first base station belongs from the first base station may correspond to a step of receiving the MGID and the ID of the M2M group zone to which the first base station belongs via a dynamic service addition (DSA) process.

To further achieve these and other advantages and in accordance with the purpose of the present invention, according to a different embodiment, a user equipment supportive of a machine-to-machine communication (M2M) includes a transceiving unit configured to transceive a radio signal with an external and a controlling unit configured to be connected with a radio communication unit, the controlling unit configured to control the transceiving unit to receive an ID of an M2M group zone to which a first base station belongs from the first base station, the controlling unit configured to control the transceiving unit to receive an MGID (M2M group identifier) and an ID of an M2M group zone supportive of the MGID from the first base station, the controlling unit configured to control the transceiving unit to receive an ID of an M2M group zone to which a second base station belongs from the first base station or the second base station, the controlling unit configured to determine whether the received MGID is supported based on the received ID of the M2M group zone to which the second base station belongs.

The controlling unit can control the transceiving unit to receive the ID of the M2M group zone to which the second base station belongs via an AAI-SCD (system configuration descriptor) message transmitted from the first base station or the second base station.

The M2M group zone to which the first station or the second station belongs may include one or more M2M group zones. If the M2M group zone to which the first station belongs includes one or more M2M group zones, the allocated MGID can be supported in a prescribed one M2M group zone only among the M2M group zones to which the first base station belongs.

The M2M group zone to which the first base station or the second base station belongs may include one or more base stations.

Advantageous Effects

According to embodiments disclosed in the present specification, an M2M user equipment in a broadband wireless communication system can recognize a change of an M2M group zone. Consequently, the user equipment can efficiently determine validity of an MGID.

DESCRIPTION OF DRAWINGS

FIG. 3 is a flowchart of an MGID update procedure according to one embodiment of the present specification;

FIG. 4 is a flowchart of an MGID update procedure according to one embodiment of the present specification;

FIG. 5 is a block diagram of an M2M user equipment and a base station according to embodiments of the present invention.

BEST MODE

Mode for Invention

Figure 1:
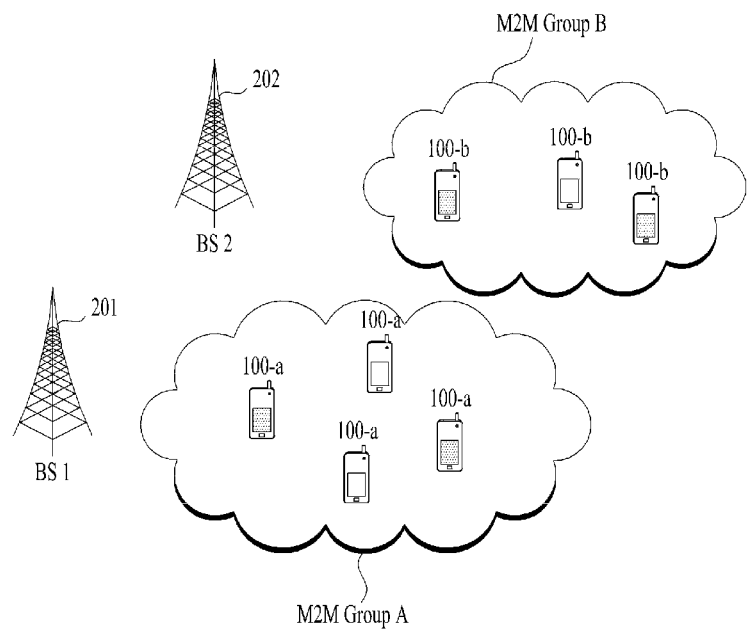
FIG. 1 is a conceptual diagram of a wireless access network to which embodiment of the present invention is applicable.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. UTRA is a part of UMTS (Universal Mobile Telecommunications System). 3GPP (3rd Generation Partnership Project) LTE (long term evolution) is a part of E-UMTS (Evolved UMTS) that uses E-UTRA and adopts OFDMA in downlink and adopts SC-FDMA in uplink. LTE-A (LTE-Advanced) is an evolved version of 3GPP LTE.

TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. IEEE 802.16m is an evolved version of IEEE 802.16e and provides backward compatibility to a system based on IEEE 802.16e. And, 802.16p provides a communication standard to support a machine type communication (MTC).

The technical terminologies used in the present specification are used only to describe a specific embodiment(s) and have no intention to restrict the present invention. The technical terminologies used in the present specification should be construed not as excessively inclusive meanings or excessively reduced meanings but as meanings generally understood by those having ordinary skill in the technical field, to which the present invention pertains, unless defined as other meanings especially in the present specification. If the technical terminologies used in the present specification fail in correctly representing the idea of the present invention, they should be substituted with technical terminologies correctly understandably by those having ordinary skill in the technical field to which the present invention pertains. Moreover, general terminologies used by the present invention may be construed not as the excessively reduced meanings but as the meanings defined in dictionaries or the sequence of the context.

And, the singular number representation used in the present specification may include the plural number representation unless mentioned clearly and differently in context. In the present application, such a terminology as 'configured', 'include' and the like should be construed not as necessarily including various components or steps written in the present specification but as including the components or steps in part or further including additional components or steps.

Moreover, a terminology, each of which includes such an ordinal number as $1^{st}$, $2^{nd}$ and the like, may be used to describe various components. In doing so, the various components should be non-limited by the corresponding terminologies, respectively. The terminologies are only used for the purpose of discriminating one component from other components. For instance, a $1^{st}$ component may be named a $2^{nd}$ component while coming within the scope of the appended claims and their equivalents. Similarly, the $2^{nd}$ component may be named the $1^{st}$ component.

In case that one component is mentioned as 'connected to' or 'accessing' another component, it may be connected to or access the corresponding component in direct. Yet, new component(s) may exist in between. On the other hand, in case that one component is mentioned as 'directly connected to' or 'directly accessing' another component, it should be understood that new component(s) may not exist in between.

In the following description, a preferable embodiment according to the present invention is explained in detail with reference to the attached drawings. The same reference numbers will be used throughout the drawings to refer to the same or like parts in this specification irrespective of the sign of the drawings and the overlapped explanation on the corresponding content can be omitted. And, in describing the present invention, if the detailed description of the related art is determined as making the point of the present invention unclear, it will be omitted. The accompanying drawings, which are included to provide a further understanding of the invention and are incorporated in and constitute a part of this specification, illustrate embodiments of the invention and together with the description serve to explain the principles of the invention only. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

For clarity, embodiments of the present specification are explained in the following description centering on IEEE 802.16 standard, by which the technical idea of the present invention disclosed in the present specification may be non-limited.

FIG. 1 is a conceptual diagram of a wireless access network to which embodiment of the present invention is applicable.

Referring to FIG. 1, a wireless access network includes a terminal 100 and base stations 201/202. The terminal 100 may be fixed or have mobility. The terminal may be called such a different terminology as a UE (user equipment), a UT (user terminal), an SS (subscriber station), a wireless device, an AMS (advanced mobile station), and the like. And, the terminal 100 includes a concept of an MTC or an M2M terminal.

The base station 201/202 generally means a fixed station communicating with a user equipment 100/110. The base station may be called such a different terminology as a Node B, a BTS (base transceiver system), an access point, and the like. One base station 201 or 202 may include one or more cells.

For clarity, embodiments of the present specification are explained in the following description centering on IEEE 802.16 standard, by which the technical idea of the present invention disclosed in the present specification may be non-limited.

An M2M user equipment according to embodiment of the present invention may belong to one or more M2M groups. The M2M group is a group of M2M user equipments sharing one or more features. For instance, the M2M group may correspond to a group of user equipments receiving a specific application service. An M2M group identifier (hereinafter abbreviated MGID) is allocated to each of the M2M groups. The MGID uniquely identifies a specific M2M group in a network entity. In this case, for instance, the network entity may correspond to an M2M server.

An M2M group identifier (MGID) is allocated by a network entity and may be allocated to a service flow of an M2M user equipment via an DSA process after an initial network entry. Or, the MGID may be allocated by a different process. The allocated MGID is maintained in the M2M user equipment unless the M2M user equipment gets out of a network or the network deletes a service flow related to the MGID. The MGID may be modified via a dynamic service change (DSC) process.

An M2M group zone identifier (or network entity identifier) is an identifier identifying a network entity allocating an MGID. In particular, the M2M group zone identifier identifies a region in which a specific MGID is valid. One M2M group may include one or more base stations and one base station may belong to one or more M2M groups. A mapping relation between a service flow and an MGID is identical to each other in one M2M group. The mapping relation between the service flow and the MGID may be different from each other in M2M groups different from each other. A base station may transmit an ID of an M2M group zone to which the base station belongs to user equipments via a broadcast message (e.g., AAI-SCD message).

Figure 2:
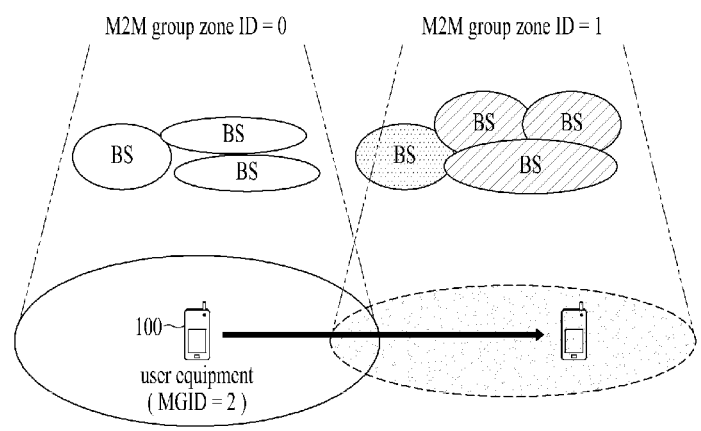
FIG. 2 is a diagram of a situation where an M2M group identifier (MGID) is needed to be updated by an M2M user equipment.

FIG. 2 is a diagram of a situation where an M2M group identifier (MGID) is needed to be updated by an M2M user equipment.

As mentioned earlier in FIG. 1, each of base stations may belong to a specific M2M group zone. Each of the base stations depicted in FIG. 2 belongs to either an M2M group zone where an ID corresponds to 0 or an M2M group zone where an ID corresponds to 1.

Assume a situation that an M2M user equipment moves from the M2M group zone where the ID corresponds to 0 to the M2M group zone where the ID corresponds to 1. In this case, an MGID supported by each of the M2M group zones may change.

If an MGID supported by an M2M group zone changes, i.e., if an M2M user equipment to which the MGID is allocated gets out of the M2M group zone where the MGID is valid, it is necessary for the user equipment and a network to recognize this and update the MGID to make the MGID suitable for the changed M2M group zone.

As depicted in FIG. 2, in the M2M group zone where the ID corresponds to 0, an MGID for a specific service flow (e.g., traffic information, map information) is allocated by 2. Yet, in the M2M group zone where the ID corresponds to 1, an MGID for an identical service flow may be allocated by 3. In this case, a user equipment can properly receive data only after the MGID is updated.

According to a current IEEE 802.16p standard, a method for a user equipment or a base station to recognize a change of an M2M group zone, which is occurred due to mobility of a user equipment, is not clearly defined yet. And, a procedure of updating an MGID, which is performed due to a change of an M2M group zone, is not clearly defined as well.

Hence, if the user equipment or the base station uses a conventionally defined procedure to recognize the change of the M2M group zone and update the MGID, (1) in case of a user equipment in a connected mode, when the user equipment moves between base stations, since the user equipment performs a handover procedure, the MGID may be updated in the middle of the handover procedure or a subsequent network reentry process. Or, the MGID may be updated via a DSC (dynamic service change) procedure. Meanwhile, (2) since a user equipment in an idle mode receives a group paging message using an MGID, if the user equipment gets out of a legacy M2M group zone, the MGID should be updated. In this case, a location update process (group location update via a paging message, timer-based update, and the like) or a network reentry process may be used to update the MGID. Yet, since the location update of the user equipment in the idle mode is performed based on a paging group in the related art, it is necessary to further define a method of recognizing a change of the M2M group zone.

As mentioned in the foregoing description, the method of recognizing a change of the M2M group zone and the MGID update procedure are not clearly defined in the legacy standard for the above mentioned two cases.

In order to supplement deficiency of the related art, the present specification proposes a method for a user equipment to receive an M2M group zone ID of a base station, which is transmitted via a broadcast message (or unicast message) as one embodiment. And, the present specification proposes a method of determining whether an allocated MGID is supported based on the received M2M group zone ID.

FIG. 3 is a flowchart of an MGID validity identification procedure according to one embodiment of the present specification.

In the present embodiment, assume that a first base station is included in an M2M group zone where an ID corresponds to 1 and a second base station is included in an M2M group zone where an ID corresponds to 2. And, assume that an MGID for a specific service flow may vary in each of the M2M group zones.

Validity of an MGID means whether an MGID of a user equipment allocated by one base station is supportive of a different base station.

The M2M group zone to which the first or the second base station belongs may include one or more M2M group zones. If the M2M group zone to which the first base station belongs corresponds to one or more, the allocated MGID may be supported in a prescribed M2M group zone only among the M2M group zone to which the first base station belongs. Meanwhile, the M2M group zone to which the first or the second base station belongs may include at least one base station.

A user equipment 100 receives an MGID and an M2M group zone identifier of a first base station from the first base station 201 [S310]. In this case, the user equipment can receive mapping information between the MGID and the M2M group zone ID together. For instance, the user equipment can receive a pair of the MGID and the M2M group zone ID.

The user equipment 100 may simultaneously receive the MGID and M2M group zone ID information of the first base station via a specific procedure (e.g., DSA procedure) or may respectively receive the MGID and M2M group zone ID information of the first base station via a separate procedure. For instance, the user equipment 100 may receive the M2M group zone ID information of the first base station via such a broadcast message as an AAI-SCD (system configuration descriptor) message, a DCD (DL channel descriptor) message, an NBR-ADV (neighbor advertisement) message, and the like. Or, the user equipment 100 may receive the M2M group zone ID information of the first base station via an SFH (superframe header) transmitted from the first base station.

The user equipment 100 stores the received MGID and the M2M group zone ID information of the first base station.

Subsequently, due to a reason of a position change and the like, the user equipment 100 gets out of a service area of the first base station 201 and enters a service area of a second base station 202. In this case, the user equipment 100 may receive M2M group zone ID information of the second base station from the first base station 201 or the second base station 202.

The M2M group zone ID information of the second base station 202 may be transmitted via such a broadcast message as an AAI-SCD message, a DCD message, an NBR-ADV message, and the like or may be transmitted via an SFH (superframe header).

Or, the user equipment may receive the M2M group zone ID information of the second base station 202 via an MGMC (M2M device group MAC control) control message. Or, the user equipment may receive the M2M group zone ID information of the second base station 202 in a subframe in which a PGID (paging group ID) information message is transmitted among a paging listening interval of the user equipment 100.

If the M2M group zone ID information of the second base station 202 is transmitted via the SFH (superframe header), the user equipment 100 may receive the SFH in a listening interval.

If the M2M group zone ID information of the second base station 202 is transmitted via the NBR-ADV message, since a user equipment in an idle mode does not mandatorily receive the NBR-ADV message, the user equipment may lose a change of the M2M group zone ID. Hence, it is preferable for a base station to transmit such a broadcast message as a paging information message and the like in a manner of adding the M2M group zone ID to the broadcast message for the user equipment in the idle mode.

And, the M2M group zone ID information of the second base station 202 may be transmitted via a newly defined message (e.g., an M2M information message). In this case, the newly defined message can be configured by a form in Table 1 as follows.

TABLE 1

```
Num of M2M network entity ID
For(i=0; i<Num of M2M network entity ID ; i++){
    M2M Network entity ID
    Num of neighbor BSID
    For(j=0; j< num of BSID; j++){
        neighbor BSID }}
```

The message may be periodically transmitted. Or, if a user equipment moves to an area of a base station not included in the message, the user equipment may make a request for a transmission of an updated message to the base station.

The user equipment 100 may receive the M2M group zone ID information of the second base station 202 after performing a network reentry process to the second base station.

Unlike the above-mentioned contents, having entered the area of the second base station, the user equipment may transmit the MGID allocated to the user equipment and the M2M group zone ID of the first base station 201 without receiving the M2M group zone ID information of the second base station 202 from the first base station 201 or the second base station 202. For instance, a user equipment in a connected mode may transmit the information in a handover process (and/or a subsequent network reentry process) and a user equipment in an idle mode may transmit the information via a location update procedure.

Having received the M2M group zone ID information of the second base station 202 via the aforementioned method, the user equipment 100 compares an M2M group zone identifier (M2M group zone ID_1) of the first base station with an M2M group zone identifier (M2M group zone ID_2) of the second base station [S330].

Based on a result of the comparison, the user equipment 100 judges validity of the MGID allocated by the first base station 201 [S340]. In particular, the user equipment judges whether the MGID allocated by the first base station 201 is supportive of the second base station as well. If the M2M group zone ID is different from each other, a previously allocated MGID may not be supported. In this case, it is preferable for a user equipment to update (or be reallocated) the MGID. In this case, an MGID update process can be performed via a location update process. To this end, a location update trigger condition for an M2M user equipment may be added. In particular, 'M2M group zone based location update' condition is added. In other word, when a user equipment is aware that a currently allocated MGID is not supportive of a different base station anymore, the user equipment performs the location update process and a base station reallocates a new MGID to the user equipment in the location update process (or thereafter).

FIG. 4 is a flowchart of an MGID validity identification procedure according to a different embodiment of the present specification.

Similar to FIG. 3, assume that a first base station is included in an M2M group zone where an ID corresponds to 1 and a second base station is included in an M2M group zone where an ID corresponds to 2. And, assume that an MGID for a specific service flow may vary in each of the M2M group zones.

In the present embodiment, a procedure for a first base station to transmit M2M group zone ID information of neighboring base stations including the first base station to a user equipment and a procedure of judging validity of a previously allocated MGID based on the information in case that a user equipment moves to a neighboring base station are explained. Following description is explained in detail with reference to FIG. 4.

A step S410 of FIG. 4 is identical to the step S310 of FIG. 3.

Subsequently, due to a reason of a position change and the like, the user equipment 100 gets out of a service area of the first base station 201 and enters a service area of a second base station 202. As mentioned in the foregoing description, if the user equipment moves to a different M2M group zone, a previously allocated MGID may be updated.

For a user equipment in a connected state, a target base station may reallocate an MGID based on mobility information of the user equipment.

For a user equipment in idle mode, a broadcast message including an M2M group zone ID of a corresponding base station should be received from the target base station to identify a change of an M2M group zone. Occasionally, this may be inefficient because the user equipment in idle mode does not know when the target base station transmits the M2M group zone ID. Consequently, the user equipment may receive all subframes transmitted by the target base station for a considerably long time. A method of improving the aforementioned inefficiency considerably causing power consumption of the user equipment is described in the following.

A user equipment 100 receives information on an M2M group zone to which neighboring base stations belong from a first base station 201 [S420]. In particular, the user equipment 100 can receive information (e.g., base station identifier list (BSID list)) on base stations belonging to a specific M2M group zone via a broadcast or a unicast message. The BSID list information can be configured by a form of Table 2 as follows. When the BSID information is transmitted via the broadcast, an AAI-SCD message, a DCD message, an MGMC control message and the like can be used. Or, a newly defined M2M group zone information message may be used.

TABLE 2

```
Num of M2M network entity ID
For(i=0; i<Num of M2M network entity ID ; i++){
    M2M Group Zone ID
    Num of neighbor BSID
    For(j=0; j< num of BSID; j++){
        neighbor BSID }}
```

If the M2M group zone information message is transmitted via the unicast, the user equipment in idle mode should receive the message after an initial network entry. If the user equipment moves to a base station not included in the message list, the user equipment should newly receive the message. The user equipment in idle mode may perform a network reentry to receive the message when the user equipment moves to a base station not included in the list.

The M2M group zone information message is transmitted together in a subframe in which a PGID information message is transmitted among a listening interval allocated to an M2M group. It is preferable that the message is not transmitted in all listening intervals for the M2M group. When the user equipment woke up in a listening interval of the user equipment, if the M2M group zone information message is transmitted in a corresponding subframe, the user equipment updates BSID list information on the M2M group zone in a manner of receiving the message.

This is because most of user equipments enter base stations listed in the BSID list, the message helps the user equipment in idle mode to minimize power consumption additionally consumed to update the corresponding information and unnecessary wake-up time.

If information (e.g., a base station identifier list (BSID list)) on base stations belonging to a specific M2M group zone is transmitted via an AAI-SCD message, the user equipment in idle mode receives the AAI-SCD message only when the user equipment in idle mode moves to a base station not included in the BSID list of a previously received AAI-SCD message. To this end, the user equipment monitors all subframes until the AAI-SCD message is received. The user equipment updates the BSID list belonging to the M2M group zone by the monitoring.

If information (e.g., a base station identifier list (BSID list)) on base stations belonging to a specific M2M group zone is transmitted via an MGMC control message, the message may be periodically transmitted in a manner that an action code is set to 'BSID information for M2M group zone ID'. In case of transmitting such a message indicating a different action code as MGID reallocation, the MGMC control message can be transmitted in a form of an event-triggered. In particular, if an action code corresponds to 're-assignment of MGID value', the control message is broadcasted only once when the user equipment updates the MGID.

The information on 'BSID list belonging to M2M group zone' defined by the present embodiment may include information on all or a part of base stations belonging to the M2M group zone. The information includes information on a neighboring base station on the basis of a prescribed one base station and the neighboring base station may correspond to a base station different from a base station transmitting the information and belonging to the M2M group zone.

If a user equipment recognizes that an M2M group zone ID of a base station to which the user equipment has moved is different from an M2M group zone ID of a base station by which an MGID in use is allocated using the aforementioned method, the MGID in use should be updated to a value suitable for a new M2M group zone. A user equipment in a connected mode can perform an MGID update when a handover is performed or via a DSC procedure. If a user equipment in idle mode recognizes that a previously allocated MGID is not supportive of a base station to which the user equipment has moved, the user equipment can update the MGID via a location update procedure.

FIG. 5 is a block diagram of an M2M user equipment and a base station according to embodiments of the present invention.

As depicted in FIG. 5, the M2M user equipment 100 is configured to include a storing unit 101, a controlling unit 102, and a transceiving unit 103. And, the user equipment 100 may include a display unit, a user interface unit, and the like.

The controlling unit 102 implements the proposed functions, processes and/or methods. Layers of a radio interface protocol can be implemented by the controlling unit 102.

The storing unit 101 is connected with the controlling unit 102 and stores a protocol to perform a wireless communication or a parameter. In particular, the storing unit stores a UE-driving system, an application, and a general file.

The transceiving unit 103 is connected with the controlling unit 102 and transmits and/or receives a radio signal.

Additionally, the display unit displays various information of a user equipment and may use such a well-known element as LCD (liquid crystal display), OLED (organic light emitting diodes), and the like. The user interface unit can be configured by a combination of such well-known user interfaces as a keypad, a touch screen, and the like.

A base station 200 includes a storing unit 201, a controlling unit 202, and a transceiving unit 203.

The controlling unit 202 implements the proposed functions, processes and/or methods. Layers of a radio interface protocol can be implemented by the controlling unit 202.

The storing unit 201 is connected with the controlling unit 202 and stores a protocol to perform a wireless communication or a parameter.

The transceiving unit 203 is connected with the controlling unit 202 and transmits and/or receives a radio signal.

The controlling unit 102/202 may include ASIC (application-specific integrated circuit), other chipset, a logical circuit and/or a data processing device. The memory 101/201 may include a ROM (read-only memory), a RAM (random access memory), a flash memory, a memory card, a storing media, and/or other storing device. The transceiving unit 103/203 may include a baseband circuit to process a radio signal. In case of implementing the embodiment of the present invention by software, the aforementioned scheme can be implemented by a module (process, function, and the like) configured to perform the aforementioned function. The module is stored in the storing unit 101/201 and can be executed by the controlling unit 102/202.

The storing unit 101/201 may be positioned at an inside or outside of the controlling unit 102/202 and may be connected with the controlling unit by a well-known medium.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

What is claimed is:

1. A method of determining whether an M2M group identifier (MGID) identifying a multicast service flow shared by a group of M2M user equipments in an M2M group zone allocated to a user equipment is supported in a wireless access system supporting a machine-to-machine communication (M2M), comprising the steps of:
   receiving an ID of an M2M group zone to which a first base station belongs from the first base station;
   receiving an MGID and an ID of an M2M group zone supportive of the MGID from the first base station;
   receiving an ID of an M2M group zone to which a second base station belongs from the first base station or the second base station; and
   determining whether the received MGID is supported based on the received ID of the M2M group zone to which the second base station belongs.

2. The method of claim 1, wherein the step of receiving the ID of the M2M group zone to which the second base station belongs from the first base station or the second base station corresponds to a step of receiving the ID of the M2M group zone to which the second base station belongs via an AAI-SCD (system configuration descriptor) message transmitted from the first base station or the second base station.

3. The method of claim 1, wherein the step of receiving the ID of the M2M group zone to which the second base station belongs from the first base station or the second base station corresponds to a step of receiving the ID of the M2M group zone to which the second base station belongs via a DCD (DL channel descriptor) message transmitted from the first base station or the second base station.

4. The method of claim 1, wherein the step of receiving the ID of the M2M group zone to which the second base station belongs from the first base station or the second base station corresponds to a step of receiving the ID of the M2M group zone to which the second base station belongs via an MGMC (M2M device group MAC control) control message transmitted from the first base station or the second base station.

5. The method of claim 1, wherein the step of receiving the ID of the M2M group zone to which the second base station belongs from the first base station corresponds to a step of receiving the ID of the M2M group zone to which the second base station belongs via an NBR-ADV (neighbor advertisement) message transmitted from the first base station.

6. The method of claim 1, wherein the step of receiving the ID of the M2M group zone to which the second base station belongs from the first base station or the second base station corresponds to a step of receiving the ID of the M2M group zone to which the second base station belongs in a subframe in which a PGID (paging group identifier) information message is transmitted among a paging listening interval of the user equipment.

7. The method of claim 1, wherein the step of receiving the ID of the M2M group zone to which the second base station belongs from the second base station comprises the steps of:
performing a process of a network reentry to the second base station; and
receiving the ID of the M2M group zone to which the second base station belongs from the second base station after the process of the network reentry is performed.

8. The method of claim 1, wherein the M2M group zone to which the first station or the second station belongs comprises one or more M2M group zones.

9. The method of claim 8, wherein if the M2M group zone to which the first station belongs comprises one or more M2M group zones, the allocated MGID is supported in a prescribed one M2M group zone only among the M2M group zones to which the first base station belongs.

10. The method of claim 1, wherein the M2M group zone to which the first base station or the second base station belongs comprises one or more base stations.

11. The method of claim 1, wherein the step of receiving the MGID and the ID of the M2M group zone to which the first base station belongs from the first base station corresponds to a step of receiving the MGID and the ID of the M2M group zone to which the first base station belongs via a dynamic service addition (DSA) process.

12. A user equipment supportive of a machine-to-machine communication (M2M), comprising:
a transceiving unit configured to transceive a radio signal with an external; and
a controlling unit configured to be connected with a radio communication unit,
the controlling unit configured to control the transceiving unit to receive an ID of an M2M group zone to which a first base station belongs from the first base station, the controlling unit configured to control the transceiving unit to receive an MGID (M2M group identifier) and an ID of an M2M group zone supportive of the MGID from the first base station, the controlling unit configured to control the transceiving unit to receive an ID of an M2M group zone to which a second base station belongs from the first base station or the second base station, the controlling unit configured to determine whether the received MGID is supported based on the received ID of the M2M group zone to which the second base station belongs.

13. The user equipment of claim 12, wherein the controlling unit is configured to control the transceiving unit to receive the ID of the M2M group zone to which the second base station belongs via an AAI-SCD (system configuration descriptor) message transmitted from the first base station or the second base station.

14. The user equipment of claim 12, wherein the M2M group zone to which the first station or the second station belongs comprises one or more M2M group zones.

15. The user equipment of claim 14, wherein if the M2M group zone to which the first station belongs comprises one or more M2M group zones, the allocated MGID is supported in a prescribed one M2M group zone only among the M2M group zones to which the first base station belongs.

16. The user equipment of claim 12, wherein the M2M group zone to which the first base station or the second base station belongs comprises one or more base stations.

* * * * *